(12) United States Patent
Chen et al.

(10) Patent No.: US 10,662,387 B2
(45) Date of Patent: May 26, 2020

(54) ADDITIVE USED IN THE PRODUCTION OF WOOD PELLETS

(71) Applicant: Arr-Maz Products, L.P., Mulberry, FL (US)

(72) Inventors: Frank Bor-Her Chen, Lakeland, FL (US); Nabil Naouli, Lithia, FL (US); Paul A. Williams, Valrico, FL (US); John Suldickas, Lakeland, FL (US)

(73) Assignee: ARR-MAZ PRODUCTS, L.P., Mulberry, FL (US)

(*) Notice: Subject to any disclaimer, the term of this patent is extended or adjusted under 35 U.S.C. 154(b) by 11 days.

(21) Appl. No.: 15/990,309

(22) Filed: May 25, 2018

(65) Prior Publication Data
US 2019/0284493 A1    Sep. 19, 2019

Related U.S. Application Data

(63) Continuation-in-part of application No. 15/990,205, filed on May 25, 2018.

(60) Provisional application No. 62/518,723, filed on Jun. 13, 2017.

(51) Int. Cl.
| *C10L 10/08* | (2006.01) |
| *C10L 5/44* | (2006.01) |
| *C10L 5/36* | (2006.01) |
| *C10L 5/08* | (2006.01) |

(52) U.S. Cl.
CPC ......... *C10L 10/08* (2013.01); *C10L 5/08* (2013.01); *C10L 5/363* (2013.01); *C10L 5/442* (2013.01); *C10L 2200/0484* (2013.01); *C10L 2290/18* (2013.01); *C10L 2290/30* (2013.01)

(58) Field of Classification Search
CPC .......... C10L 10/08; C10L 5/442; C10L 5/363; C10L 5/08; C10L 2290/30; C10L 2200/0484; C10L 2290/18
See application file for complete search history.

(56) References Cited

U.S. PATENT DOCUMENTS

| 4,398,917 A | 8/1983 | Reilly |
| 5,910,454 A | 6/1999 | Sprules |
| 6,589,442 B1 | 7/2003 | Wilson et al. |
| 8,871,345 B2 | 10/2014 | Kikuchi et al. |
| 8,951,309 B2 | 2/2015 | Bragdon |
| 9,511,508 B2 | 12/2016 | Warnes et al. |
| 9,809,775 B2 | 11/2017 | Iverson et al. |
| 2006/0230673 A1 | 10/2006 | Barford et al. |
| 2007/0251143 A1 | 11/2007 | Michalek et al. |
| 2008/0022586 A1* | 1/2008 | Gilbert ............ C10L 5/12 44/490 |
| 2008/0206572 A1 | 8/2008 | Edelmann et al. |
| 2010/0146850 A1 | 6/2010 | Bexell |
| 2011/0256449 A1 | 10/2011 | Mao |
| 2012/0204482 A1 | 8/2012 | Heimann |
| 2013/0133246 A1 | 5/2013 | Blieninger |
| 2015/0203774 A1 | 7/2015 | Lake |
| 2016/0169581 A1 | 6/2016 | Kotyk |

FOREIGN PATENT DOCUMENTS

| CA | 1229229 | | 11/1987 |
| CA | 2670530 | | 12/2010 |
| CN | 103992835 | | 8/2016 |
| EP | 0542616 | * | 5/1993 |
| EP | 0725128 | | 7/1996 |
| EP | 2216387 | | 12/2012 |
| EP | 2602295 | | 6/2013 |
| JP | 2010121047 | | 6/2010 |
| KR | 20100011691 | | 5/2009 |
| WO | 2002055637 | | 7/2002 |
| WO | 2009006661 | | 1/2009 |
| WO | 2011062488 | | 5/2011 |
| WO | 2013030311 | | 3/2013 |

OTHER PUBLICATIONS

Craven, J.M. etc. "Hydrophobic coatings for moisture stable wood pellets", Biomass and Bioenergy 80 (2015) 278-285.
Tarasov, Dmitry et al., "Effect of additives on wood pellet physical and thermal characteristics: A review", ISRN Forestry, 2013, vol. 2013, Article No. 8769.
International Search Report and Written Opinion in PCT/US2018/035647; International Application Division; Korean Intellectual Property Office 189 Cheongsa-ro, Seo-gu, Daejeon, 35208, Republic of Korea, dated Sep. 20, 2018.
International Search Report and Written Opinion from Corresponding PCT Patent Application PCT/US2019/033985 dated Sep. 9, 2019; Korean Intellectual Property Office.

* cited by examiner

*Primary Examiner* — Cephia D Toomer
(74) *Attorney, Agent, or Firm* — Head, Johnson, Kachigian & Wilkinson, PC

(57) ABSTRACT

An additive used in the production of wood pellets to increase throughput. The additive may be applied as a booster to wood prior to forming the wood into pellets. The booster may comprise 30% to 100% tall oil pitch and 70% to 0% tall oil head and may be applied at a rate of 0.01 to 2 wt. % of the wood.

42 Claims, No Drawings

ADDITIVE USED IN THE PRODUCTION OF WOOD PELLETS

CROSS REFERENCE

This application is a continuation in part of, claims priority to, and incorporates by reference U.S. patent application Ser. No. 15/990,205 and U.S. Provisional Application No. 62/518,723, both titled "Structured Composite Wood Pellets for Dust/Fines Mitigation and Method of Producing Them" and filed May 25, 2018 and Jun. 13, 2017, respectively.

BACKGROUND OF THE INVENTION

Field of the Invention

This invention relates generally to an additive used in the product of wood pellets, and more particularly, but not by way of limitation, to an additive that improves production of wood pellets through increased pellet mill throughput and/or increased pellet die service life.

Description of the Related Art

Wood pellets are often used as fuel for industrial power plants and for residential uses, such as barbeque grill fuel and other uses. Such wood pellets, however, break easily and tend to generate dust upon impact and abrasion, such as during shipping and handling. In fact, for industrial use, such wood pellets are designed to be ground up prior to use. Dust can be a major hazard at places where wood pellets are handled in bulk, such as at ports during loading and unloading, causing concerns about human safety, fire hazard, and fines by the port authority.

In addressing this issue, the inventors of the present invention discovered another challenge of wood pellet manufacturers: how to increase production rates without major capital expansion. Increasing the throughput of pellet mill/pellet production may allow manufacturers to address this challenge. The ability to boost production may also significantly increase the profit of the pellet manufacturers.

Based on the foregoing, it is desirable to provide an additive that increases throughput in the production of wood pellets.

SUMMARY OF THE INVENTION

In general, in a first aspect, the invention relates to a method of producing wood pellets comprising applying a booster to wood prior to pelletizing the wood into wood pellets, where the application of the booster results in increased throughput of the wood pellets compared to throughput of wood pellets formed from wood without the booster. The booster may comprise 30% to 100% tall oil pitch and 70% to 0% tall oil head. More particularly, the booster may comprise 70% to 100% tall oil pitch and 30% to 0% tall oil head. Even more particularly, the booster may comprise 85% tall oil pitch and 15% tall oil head. The booster may be applied to the wood meal at a rate of 0.01 to 2 wt. % of the wood, or more particularly at a rate of 0.1 wt. % of the wood.

The booster may lubricate the wood and allow the wood pellets to be formed with less energy than would be required to form wood pellets from wood without the booster.

The method may further comprise preparing the wood meal for pellet formation prior to applying the booster to the wood meal. Additionally or alternately, the method may further comprise preparing the wood meal for pellet formation after applying the booster to the wood meal, and/or applying the booster to wood chips prior to processing the wood chips into the wood meal. Preparing the wood meal may comprise grinding the wood meal to a desired size distribution and/or conditioning the wood meal. Forming the wood into wood pellets may comprise placing the wood into a pelletizing mill, forcing the wood into a die, and compressing the wood into wood pellets. Applying the booster to the wood may comprise spraying the booster onto the wood.

The application of the booster may not result in decreased quality of the wood pellets compared wood pellets formed from wood without the booster. The booster may not increase the elasticity of the wood pellets. The booster may not function as a binder within the wood pellets.

The invention also relates to wood pellets produced according to the foregoing process and to the booster used in the foregoing process.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a novel throughput booster for use in the wood pellet manufacturing process. While reference is made throughout to wood pellets and the wood pellet manufacturing process, the same booster may be utilized in the manufacture of other materials to similar effect. In particular, the booster may be used in the production of other biomasses and/or energy pellets, such as in the production of bagasse.

The booster may increase pellet mill production throughput. The booster may also increase pellet quality preservation, which feature is normally difficult to attain. The booster may lower the energy required to form the pellet in the pellet die, for example by lubricating the wood meal that is being forced into the die, which may extend the service life of the pellet die.

The wood pellet manufacture process may begin by preparing wood chips into wood meal. This may include grinding soft wood, such as pine, or hard wood, such as beech, to a particular size distribution to generate the wood meal. The wood meal may then be conditioned, such as by steam. The conditioned wood meal may then be placed into a pelletizing mill, where it is forced into a die and compressed into wood pellets.

The booster of the present invention may be applied to the wood meal right after conditioning and before the wood meal is placed into the pelletizing mill. Additionally or alternately, the booster of the present invention may be applied to the wood meal prior to conditioning. Additionally or alternately, the booster of the present invention may be applied to the wood chips prior to processing the wood chips into wood meal.

The booster may be applied via spraying, or via any other desired form of application. For example, the booster may be applied in a continuous manner through spraying, dripping, and/or dipping the conditioned wood chips/meal while on a moving belt or while falling, or may be applied using a rotary drum mixer, a ribbon blender with soft ribbon and soft wall, a continuous dip coater, or other machine.

The booster may comprise one or more of the following: pine chemical fractions such as crude tall oil, distilled tall oil, tall oil fatty acids, tall oil rosin, tall oil pitch, wood rosin, gum rosin, and/or tall oil heads; lignin or hydrophobic lignin (functionalized lignin with hydrophobic chain); starch; non-food use sustainable wax such as natural alcohol bottoms; cellulose derivatives, hemicellulose, animal and/or vegetable fatty acids and/or oils; and/or any combination thereof. In particular, the booster may be a blend of tall oil pitch and tall oil head. For example, the booster may be a blend of approximately 30% to 100% tall oil pitch and approximately 70% to 0% tall oil head. More particularly, the booster may be a blend of 85% tall oil pitch and 15% tall oil head. The booster may be applied at a dosage rate of 0.01 to 2 wt. % of the wood meal. More particularly, the booster may be applied at a dosage rate of 0.1 wt. %. The use of the booster may result in increased throughput. The increase in throughput may not be associated with decreased quality of the resultant wood pellets, either in terms of percent fines, percent moisture content, bulk density, or mechanical durability.

The booster may be used in conjunction with further optimization of the pellet manufacture process. For example, the booster may be used in conjunction with die modification or other process changes that may be combined to increase throughput and also make quality pellets.

The resultant wood pellets may be 1" long and ¼" in diameter, or any other desired size. They may be made of compressed wood. The wood pellets may not comprise torrified wood.

The booster may not increase the elasticity of the wood pellets. The booster may be heated for mixing and/or application but may still be spreadable after cooling. The booster may not have the appropriate properties and/or may not be applied in appropriate quantities to function as a binder within the wood pellets. In particular, less of the booster may be used than the amount of similar material required for use as or in a binder. This decreases the cost of the finished product, as compared to a wood pellet with the same materials used as a binder.

The booster and resultant wood pellets may be green and sustainable. Alternately, conventional non-green and non-sustainable booster elements may be applied, either alone or in combination with green and sustainable elements.

EXAMPLES

In both examples, testing was conducted at a wood pellet pilot plant with a throughput of approximately 300 kg/hour. A 6 mm die with a compression ratio of 1 to 4 was used. In the plant, shaves of soft wood, namely pine, or hardwood, namely beech, were pre-grinded in a hammer mill to have a particle size distribution of greater than 90% with particles smaller than 1.345 mm. The wood meal was conditioned using steam, and then a wood pellet throughput booster designated BOOSTER SAMPLE A was sprayed onto the conditioned wood meal before it entered into the pelletizing mill. Wood pellets collected at the outlet of the pelletizing mill were subjected to quality tests, including determining percent fines, mechanical durability, bulk density, and percent moisture content.

BOOSTER SAMPLE A had a composition of 85% tall oil pitch and 15% tall oil head.

Example 1

Hardwood (beech) based wood meal was used for this test. The dosage of BOOSTER SAMPLE A was 0.1 wt % of the wood meal. The results are summarized in Table 1 below.

TABLE 1

Summary Qualities of the Hardwood based Wood pellets (0.1 wt. % BOOSTER SAMPLE A Booster)

| Type of Wood Pellets | Throughput (kg/hr) | % Fines | % Moisture Content of the Pellets Hot | % Moisture Content of the Pellets after Cooling | Bulk Density (kg/m3) Cool | % Mechanical Durability |
|---|---|---|---|---|---|---|
| Control (No Booster) | 298 | 0.42 | 10 | 7.0 | 668 | 98.0 |
| With 0.1 Wt. % Booster | 298 | 0.50 | 9.5 | 7.6 | 668 | 98.4 |
| With 0.1 Wt. % Booster | 340 | 0.53 | 6.6 | 4.8 | 672 | 98.3 |

Wood pellet production throughput was increased approximately 14.1% without sacrificing the quality in percent fines, percent moisture content, bulk density, and mechanical durability. Typically, wood pellets should have a percent fines less than 1.75, percent moisture content less than 8.5, bulk density greater than 620, and mechanical durability greater than 98%. The wood pellets produced with increased throughput remained within these parameters.

Example 2

Softwood (pine) based wood meal was used for this test. The dosage of BOOSTER SAMPLE A was 0.1 wt % of the wood meal. The results are summarized in Table 2 below.

TABLE 2

Summary Qualities of the Softwood based Wood pellets (0.1 wt. % BOOSTER SAMPLE A Booster)

| Type of Wood Pellets | Throughput (kg/hr) | % Fines | % Moisture Content of the Pellets Hot | % Moisture Content of the Pellets after Cooling | Bulk Density (kg/m3) Cool | % Mechanical Durability |
|---|---|---|---|---|---|---|
| Control (No Booster) | 350 | 0.5 | 7 | 3.6 | 684 | 97.89 |
| With 0.1 Wt. % Booster | 350 | 0.8 | 7 | 3.5 | 672 | 95.47 |
| With 0.1 Wt. % Booster | 400 | 1.1 | 6.8 | 3.7 | 694 | 97.60 |
| With 0.1 Wt. % Booster | 430 | 0.50 | 6.5 | 3.5 | 684 | 97.91 |

Wood pellet production throughput was increased approximately 23% without sacrificing the quality in percent fines, percent moisture content, and bulk density, which all remained within typically desirable parameters. Mechanical durability is inherently lower with softwood than with hardwood, but the use of the booster did not result in a significant reduction in mechanical durability compared with the control. While this particular system was not optimized for soft wood pellets, further optimization to the process could increase mechanical durability and such changes are compatible with the use of the booster according to the present invention.

Whereas, the devices and methods have been described in relation to the drawings and claims, it should be understood that other and further modifications, apart from those shown or suggested herein, may be made within the spirit and scope of this invention.

What is claimed is:

1. A method of producing wood pellets comprising:
    applying a booster to wood, where the booster comprises tall oil pitch and tall oil head; and
    forming the wood into wood pellets,
where the application of the booster results in increased throughput of the wood pellets compared to throughput of wood pellets formed from wood without the booster.

2. The method of claim 1 where the booster comprises:
    30% to 99% tall oil pitch; and
    70% to 1% tall oil head.

3. The method of claim 2 where the booster comprises:
    70% to 99% tall oil pitch; and
    30% to 1% tall oil head.

4. The method of claim 3 where the booster comprises:
    85% tall oil pitch; and
    15% tall oil head.

5. The method of claim 1 where the booster is applied to the wood at a rate of 0.01 to 2 wt. % of the wood.

6. The method of claim 5 where the booster is applied at a rate of 0.1 wt. % of the wood.

7. The method of claim 1 where the booster lubricates the wood and allows the wood pellets to be formed with less energy than would be required to form wood pellets from wood without the booster.

8. The method of claim 1 further comprising preparing the wood for pellet formation prior to applying the booster to the wood.

9. The method of claim 8 where the wood is wood meal and where preparing the wood comprises grinding the wood meal to a desired size distribution prior to applying the booster to the wood meal.

10. The method of claim 8 where the wood is wood meal and where preparing the wood comprises conditioning the wood meal prior to applying the booster to the wood.

11. The method of claim 8 where the wood is wood chips, where preparing the wood comprises processing the wood chips to wood meal, and where applying the booster to the wood comprises applying the booster to the wood meal after processing the wood chips to wood meal.

12. The method of claim 11 where preparing the wood further comprises grinding the wood meal to a desired size distribution prior to applying the booster to the wood meal.

13. The method of claim 11 where preparing the wood further comprises conditioning the wood meal prior to applying the booster to the wood meal.

14. The method of claim 11 further comprising grinding the wood meal to a desired size distribution after applying the booster to the wood meal.

15. The method of claim 11 further comprising conditioning the wood meal after applying the booster to the wood meal.

16. The method of claim 1 further comprising preparing the wood for pellet formation after applying the booster to the wood, where preparing the wood for pellet formation comprises one or more of the following:
    processing wood chips to wood meal;
    grinding wood meal to a desired size distribution; and/or
    conditioning wood meal.

17. The method of claim 1 where forming the wood into wood pellets comprises placing the wood into a pelletizing mill, forcing the wood into a die, and compressing the wood into wood pellets.

18. The method of claim 1 where applying the booster to the wood comprises spraying the booster onto the wood.

19. The method of claim 1 where the application of the booster does not result in decreased quality of the wood pellets compared wood pellets formed from wood without the booster.

20. The method of claim 1 where the booster does not increase the elasticity of the wood pellets.

21. The method of claim 1 where the booster does not function as a binder within the wood pellets.

22. A wood pellet produced by a process comprising the steps of:
    applying a booster to wood, where the booster comprises tall oil pitch and tall oil head; and
    forming the wood into wood pellets,
where the application of the booster results in increased throughput of the wood pellets compared to throughput of wood pellets formed from wood without the booster.

23. The wood pellet of claim 22 where the booster comprises:
30% to 99% tall oil pitch; and
70% to 1% tall oil head.

24. The wood pellet of claim 23 where the booster comprises:
70% to 99% tall oil pitch; and
30% to 1% tall oil head.

25. The wood pellet of claim 24 where the booster comprises:
85% tall oil pitch; and
15% tall oil head.

26. The wood pellet of claim 22 where the booster comprises 0.01 to 2 wt. % of the wood pellet.

27. The wood pellet of claim 26 where the booster comprises 0.1 wt. % of the wood pellet.

28. The wood pellet of claim 22 where the booster lubricates the wood and allows the wood pellets to be formed with less energy than would be required to form wood pellets from wood without the booster.

29. The wood pellet of claim 22 where the steps further comprise preparing the wood for pellet formation prior to applying the booster to the wood.

30. The wood pellet of claim 29 where the wood is wood meal and where preparing the wood comprises grinding the wood meal to a desired size distribution prior to applying the booster to the wood meal.

31. The wood pellet of claim 29 where the wood is wood meal and where preparing the wood comprises conditioning the wood meal prior to applying the booster to the wood.

32. The wood pellet of claim 29 where the wood is wood chips, where preparing the wood comprises processing the wood chips to wood meal, and where applying the booster to the wood comprises applying the booster to the wood meal after processing the wood chips to wood meal.

33. The wood pellet of claim 32 where preparing the wood further comprises grinding the wood meal to a desired size distribution prior to applying the booster to the wood meal.

34. The wood pellet of claim 32 where preparing the wood further comprises conditioning the wood meal prior to applying the booster to the wood meal.

35. The wood pellet of claim 32 further comprising grinding the wood meal to a desired size distribution after applying the booster to the wood meal.

36. The wood pellet of claim 32 further comprising conditioning the wood meal after applying the booster to the wood meal.

37. The wood pellet of claim 22 where the steps further comprise preparing the wood for pellet formation after applying the booster to the wood, where preparing the wood for pellet formation comprises one or more of the following:
processing wood chips to wood meal;
grinding wood meal to a desired size distribution; and/or
conditioning wood meal.

38. The wood pellet of claim 22 where forming the wood into wood pellets comprises placing the wood into a pelletizing mill, forcing the wood into a die, and compressing the wood into wood pellets.

39. The wood pellet of claim 22 where applying the booster to the wood comprises spraying the booster onto the wood.

40. The wood pellet of claim 22 where the application of the booster does not result in decreased quality of the wood pellets compared wood pellets formed from wood without the booster.

41. The wood pellet of claim 22 where the booster does not increase the elasticity of the wood pellets.

42. The wood pellet of claim 22 where the booster does not function as a binder within the wood pellets.

* * * * *